United States Patent
Watanabe et al.

(10) Patent No.: US 9,281,723 B2
(45) Date of Patent: Mar. 8, 2016

(54) ROTARY ELECTRIC MACHINE WITH TAPERED PERMANENT MAGNET

(75) Inventors: Kenji Watanabe, Kitakyushu (JP);
Toshiyuki Yamagishi, Kitakyushu (JP);
Takashi Nomiyama, Kitakyushu (JP);
Naotake Yoshizawa, Kitakyushu (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 552 days.

(21) Appl. No.: 13/541,025

(22) Filed: Jul. 3, 2012

(65) Prior Publication Data
US 2013/0009505 A1 Jan. 10, 2013

(30) Foreign Application Priority Data
Jul. 8, 2011 (JP) ................... 2011-151637

(51) Int. Cl.
*H02K 1/27* (2006.01)
*H02K 21/12* (2006.01)

(52) U.S. Cl.
CPC .............. *H02K 1/2766* (2013.01); *H02K 1/276* (2013.01); *H02K 1/27* (2013.01); *H02K 21/12* (2013.01)

(58) Field of Classification Search
CPC ....... H02K 1/27; H02K 1/2766; H02K 1/276; H02K 21/12
USPC ............. 310/156.08, 156.09, 156.11, 156.53, 310/156.56, 216.091, 216.099
IPC ........................................................ H02K 1/27
See application file for complete search history.

(56) References Cited

U.S. PATENT DOCUMENTS

| 4,260,921 A * | 4/1981 | Silver ..................... | H02K 1/278 310/156.19 |
| 4,332,079 A * | 6/1982 | Silver ..................... | H02K 1/278 29/598 |
| 4,445,062 A * | 4/1984 | Glaser ................... | H02K 1/2773 310/156.59 |
| 4,543,506 A * | 9/1985 | Kawada ............... | H02K 1/2773 310/156.22 |
| 8,018,110 B2 * | 9/2011 | Alexander ........... | H02K 1/2773 310/156.56 |

(Continued)

FOREIGN PATENT DOCUMENTS

| JP | S54-065309 | 5/1979 |
| JP | H02-037553 | 3/1990 |

(Continued)

OTHER PUBLICATIONS

The Japanese Office Action dated Jan. 8, 2013 and the English translation thereof.

*Primary Examiner* — John K Kim
(74) *Attorney, Agent, or Firm* — Bacon & Thomas, PLLC

(57) ABSTRACT

A rotary electric machine includes a stator; and a rotor including an iron core, which has a tubular connecting portion surrounding a shaft and 10 magnetic pole portions integrally formed with the connecting portion corresponding to a pole number, and a plurality of permanent magnets arranged between the magnetic pole portions. The iron core includes axially-penetrated magnet accommodating air gaps formed between the magnetic pole portions at the radial outer side of the connecting portion, and the permanent magnets are installed in the respective magnet accommodating air gaps such that a radial outer surface of each of the permanent magnets makes close contact with an inner surface of each of the magnet accommodating air gaps and such that a gap exists between a radial inner surface of each of the permanent magnets and the connecting portion.

5 Claims, 4 Drawing Sheets

(56) References Cited

U.S. PATENT DOCUMENTS

| | | | |
|---|---|---|---|
| 8,279,767 B2 * | 10/2012 | Kang | H04B 1/715 370/252 |
| 2009/0096308 A1 * | 4/2009 | Staudenmann | 310/156.08 |
| 2010/0289386 A1 * | 11/2010 | Gerstler | H02K 1/2773 310/60 A |
| 2013/0009505 A1 * | 1/2013 | Watanabe et al. | 310/156.08 |

FOREIGN PATENT DOCUMENTS

| | | |
|---|---|---|
| JP | H7-36459 | 7/1995 |
| JP | 2006-115663 | 4/2006 |
| JP | 2009-050148 | 3/2009 |

* cited by examiner

ROTARY ELECTRIC MACHINE WITH TAPERED PERMANENT MAGNET

CROSS-REFERENCE TO RELATED APPLICATIONS

The present application claims priority under 35 U.S.C. §119 to Japanese Patent Application No. 2011-151637 filed on Jul. 8, 2011. The contents of this application are incorporated herein by reference in their entirety.

BACKGROUND OF THE INVENTION

1. Field of the Invention

Embodiments disclosed herein relate to a rotary electric machine.

2. Description of the Related Art

Japanese Utility Model Publication No. H7-036459 discloses a rotor including a laminated iron core, which has an annular connecting portion surrounding a rotating shaft and a plurality of sector-like magnetic pole portions integrally formed with the connecting portion in a number corresponding to a pole number, and a plurality of rectangular permanent magnets arranged between the magnetic pole portions. Punched holes, each of which has enlarged portions at the opposite ends thereof, are formed over the magnetic pole portions and the connecting portion of the iron core. Non-magnetic reinforcing members are filled and inserted into the punched holes.

Rare earth magnets such as neodymium magnets or the like are extensively used as permanent magnets of a rotor for a rotary electric machine. The rare earth magnets are high in magnetic flux density and, therefore, are capable of reducing the size of permanent magnets of a rotor. However, the rare earth magnets suffer from the disadvantage of high cost. In view of this, it is thinkable to use inexpensive magnets such as ferrite magnets or the like. In this case, however, it is necessary to increase the volume of permanent magnets because the ferrite magnets are lower in magnetic flux density than the rare earth magnets.

The conventional rotor referred to above is provided with the punched holes for preventing magnetic flux leakage between the permanent magnets. This limits the dimensions of the permanent magnets in the radial direction and in the direction perpendicular to the radial direction. It is therefore difficult to increase the volume of the permanent magnets without making the diameter of the rotor larger. On the other hand, if the punched holes are omitted in an effort to increase the volume of the permanent magnets, the leaked magnetic flux grows larger. Thus, there is a problem in that the decrease of the leaked magnetic flux and the increase of the volume of the permanent magnets are not compatible.

SUMMARY OF THE INVENTION

In accordance with an aspect of the present invention, there is provided a rotary electric machine, including a stator; and a rotor including an iron core, which has a tubular connecting portion surrounding a rotating shaft and a plurality of magnetic pole portions integrally formed with the connecting portion in a number corresponding to a pole number, and a plurality of permanent magnets arranged between the magnetic pole portions, wherein the iron core includes axially-penetrated magnet accommodating air gaps formed between the magnetic pole portions at the radial outer side of the connecting portion, and the permanent magnets are installed in the respective magnet accommodating air gaps such that a radial outer surface of each of the permanent magnets makes close contact with an inner surface of each of the magnet accommodating air gaps and such that a specified gap exists between a radial inner surface of each of the permanent magnets and the connecting portion.

BRIEF DESCRIPTION OF THE DRAWINGS

The objects and features of the present invention will become apparent from the following description of embodiments, given in conjunction with the accompanying drawings, in which.

DESCRIPTION OF THE EMBODIMENTS

An embodiment of the present invention will now be described in detail with reference to the accompanying drawings which form a part hereof.

Figure 1:
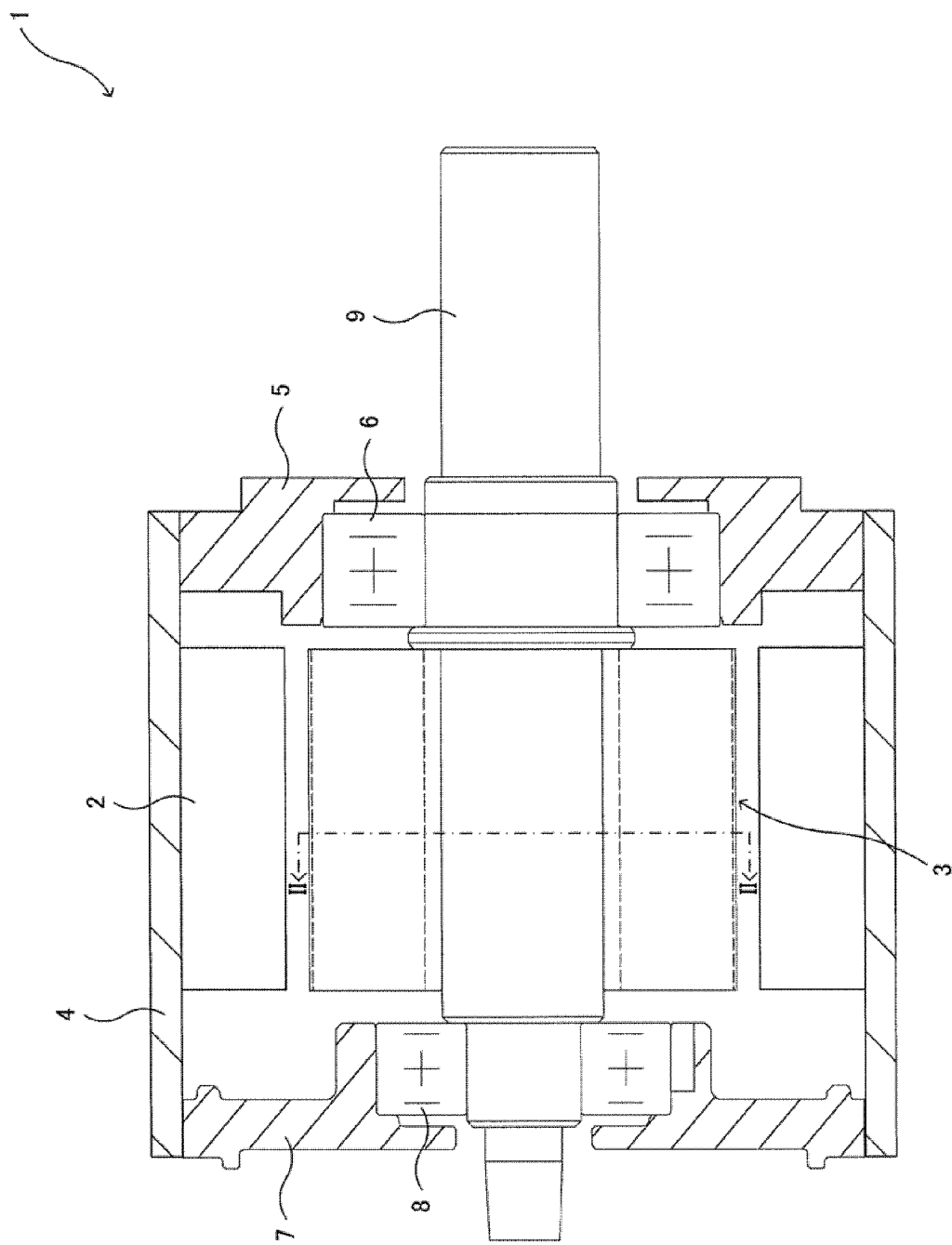
FIG. 1 is a vertical section view showing the overall configuration of a rotary electric machine in accordance with an embodiment of the present invention.

As shown in FIG. 1, a rotary electric machine 1 in accordance with an embodiment of the present invention includes a stator 2 and a rotor 3 which are arranged in a radially opposing relationship. The rotary electric machine 1 is an inner-rotor-type electric motor in which the rotor 3 is arranged at the inner side of the stator 2. Specifically, the rotary electric machine 1 is an IPM (Interior Permanent Magnet) motor having permanent magnets arranged within the rotor 3.

The rotary electric machine 1 includes the stator 2 as an armature; the rotor 3 as a field magnet; a frame 4 provided on the outer circumferential surface of the stator 2; a load-side bracket 5 provided at the load-side end (the right end in FIG. 1) of the frame 4; a load-side bearing 6 whose outer race is fitted to the load-side bracket 5; a counter-load-side bracket 7 provided at the counter-load-side end (the left end in FIG. 1) of the frame 4; a counter-load-side bearing 8 whose outer race is fitted to the counter-load-side bracket 7; and a shaft (rotating shaft) 9 rotatably supported by the load-side bearing 6 and the counter-load-side bearing 8.

Figure 2:
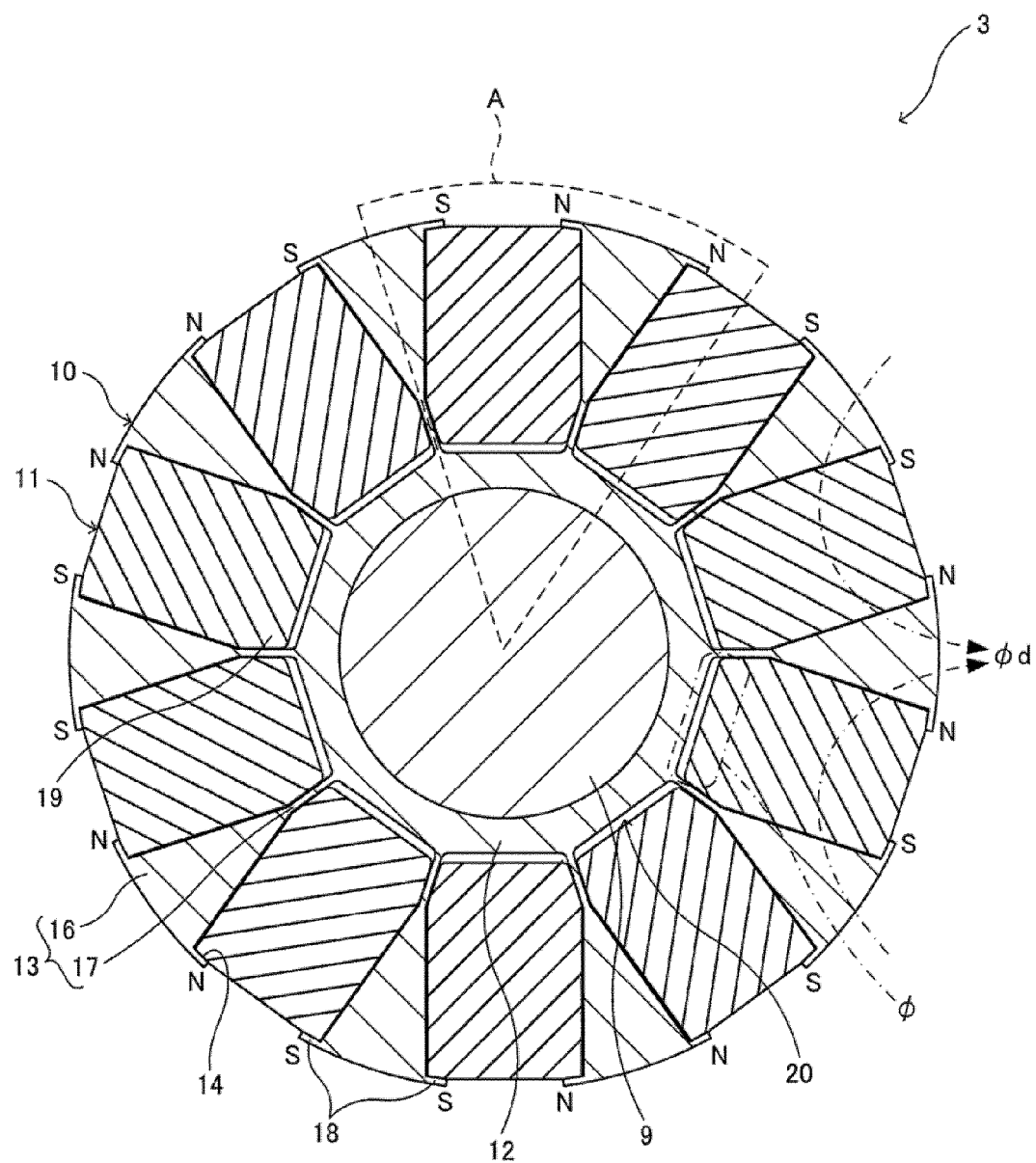
FIG. 2 is a section view taken along line II-II in FIG. 1.
Figure 3:
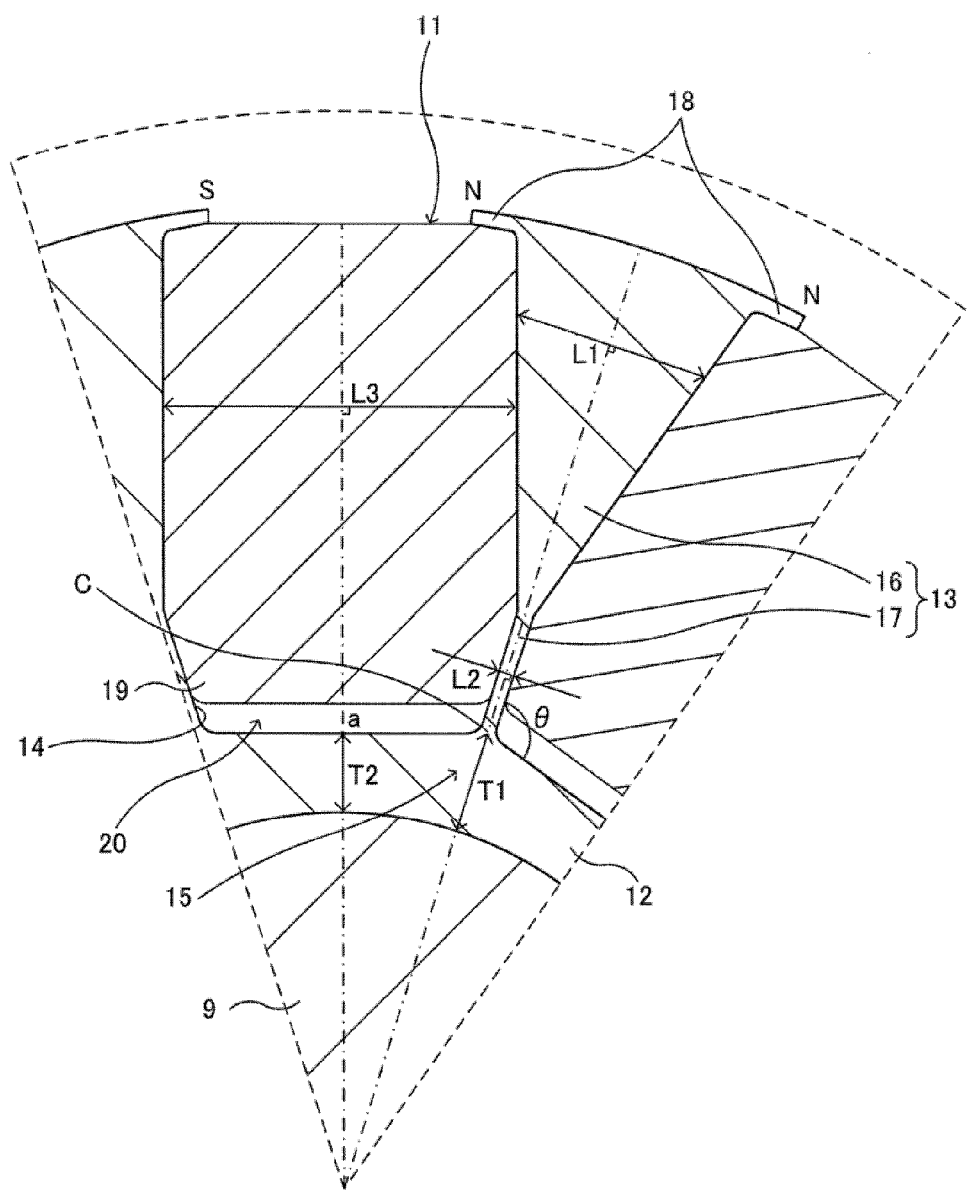
FIG. 3 is a partially-enlarged view of the portion designated by "A" in FIG. 2.

The rotor 3 is provided on the outer circumferential surface of the shaft 9. As shown in FIGS. 2 and 3, the rotor 3 includes a laminated iron core 10 and a plurality of (ten, in the present embodiment) permanent magnets 11.

The laminated iron core 10 includes a tubular connecting portion 12 surrounding the shaft 9 and a plurality of (ten, in the present embodiment) magnetic pole portions 13 radially provided as a single body at the radial outer side of the connecting portion 12 in a number corresponding to a pole number. In other words, the laminated iron core 10 has a structure in which ten magnetic pole portions 13 protrude radially outward from the connecting portion 12 in a radial pattern.

Further, the laminated iron core 10 has a plurality of groove-like magnet accommodating air gaps 14 formed between the magnetic pole portions 13 (i.e., between the adjoining magnetic pole portions 13) at the radial outer side of the connecting portion 12. The magnet accommodating air gaps 14 are formed to penetrate the magnetic pole portions 13 in the axial direction (in the front-rear direction of the drawing sheet in FIGS. 2 and 3) and are opened radially outward. The permanent magnets 11 are arranged within the respective magnet accommodating air gaps 14 (the details will be described later).

The outer circumferential surface (radial outer surface) of the connecting portion 12 is flat between joint regions C (i.e., between adjoining joint regions "C") joined to the magnetic pole portions 13. The connecting portion 12 includes thick sections 15 formed near the respective joint regions C. The radial thickness of the thick sections 15 is larger than the radial thickness of other circumferential sections of the connecting portion 12 than the joint regions C. In other words, the radial thickness of the connecting portion 12 is not uniform along the circumferential direction. The radial thickness of the connecting portion 12 near the joint regions C (i.e., the radial thickness of the thick sections 15) is larger than the radial thickness of other circumferential sections of the connecting portion 12 than the joint regions C.

For example, a radial thickness "T1" of the connecting portion 12 in the joint regions C is larger than a radial thickness "T2" in the middle position "a" between the joint regions C (i.e., between adjoining joint regions C), one of the circumferential positions other than the joint regions C of the connecting portion 12.

Each of the magnetic pole portions 13 includes a body section 16 having a substantially sector-like shape in a section view; and a plate-like joint section 17 which connects the body section 16 and the connecting portion 12. A dimension "L1" of the body section 16 in the direction perpendicular to the radial direction grows smaller radially inward. A dimension "L2" of the joint section 17 in the direction perpendicular to the radial direction is substantially constant.

The body section 16 includes flanges 18 formed at the radial outer end thereof to extend in the circumferential opposite directions. The flanges 18 are configured to partially cover the outer surface (radial outer surface) of each of the permanent magnets 11 arranged within the magnet accommodating air gaps 14 so that a portion of the outer surface of each of the permanent magnets 11 can be exposed to the outside. The joint section 17 is positioned between taper portions 19 of the permanent magnets 11 (i.e., between the taper portions 19 of the adjoining permanent magnets 11) arranged within the magnet accommodating air gaps 14. The taper portions 19 will be described later.

Each of the permanent magnets 11 is formed of a ferrite magnet and includes a taper portion 19 formed at the radial inner side thereof. A dimension "L3" of the taper portion 19 in the direction perpendicular to the radial direction grows smaller radially inward. The inner surface (radial inner surface) of each of the permanent magnets 11 is flat. The outer surfaces of the respective permanent magnets 11 make close contact with the inner surfaces (radial inner surfaces) of the flanges 18 (i.e., the inner circumferential surfaces of the magnet accommodating air gaps 14). Each of the permanent magnets 11 is offset radially outward within each of the magnet accommodating air gaps 14 in such a way that a specified gap 20 exists between the inner surface of each of the permanent magnets 11 and the connecting portion 12

In the present embodiment, the permanent magnets 11, which are axially inserted into the magnet accommodating air gaps 14, offset radially outward and are adhesively fixed within the magnet accommodating air gaps 14. For easier insertion of the permanent magnets 11, the magnet accommodating air gaps 14 are formed to have a dimension larger than the dimension of the permanent magnets 11. In other words, the permanent magnets 11 are axially inserted into the magnet accommodating air gaps 14 when the permanent magnets 11 are installed in the magnet accommodating air gaps 14. Since the permanent magnets 11 are provided with the taper portions 19, it becomes possible to insert the permanent magnets 11 into the magnet accommodating air gaps 14 in a radially outwardly offset state.

The inner surface of each of the permanent magnets 11 is pressed radially outward by a jig. The outer surface of each of the permanent magnets 11 is brought into contact with the inner surfaces of the flanges 18 and is adhesively fixed in this state.

In the rotary electric machine 1 of the present embodiment, the magnet torque generated by the composite magnetic flux Φd (see FIG. 2) obtained by combining the magnetic flux of the laminated iron core 10 and the magnetic flux of the permanent magnets 11 in a direction perpendicular to the shaft 9 is used as the torque of the rotor 3.

As described above, the rotor 3 of the rotary electric machine 1 of the present embodiment includes the laminated iron core 10 having the connecting portion 12 and the ten magnetic pole portions 13 one-piece formed with each other; and the ten permanent magnets 11 arranged between the magnetic pole portions 13 of the laminated iron core 10. The permanent magnets 11 are installed within the magnet accommodating air gaps 14 such that the outer surface of each of the permanent magnets 11 makes close contact with the inner surfaces of the flanges 18 and such that a specified gap 20 exists between the inner surface of each of the permanent magnets 11 and the connecting portion 12. In other words, the permanent magnets 11 are offset radially outward within the magnet accommodating air gaps 14.

By arranging the permanent magnets 11 in the outwardly offset state, it is possible to form air gaps (gaps 20) between the permanent magnets 11 and the connecting portion 12, thereby reducing the leaked magnetic flux. Since the leaked magnetic flux can be reduced in this manner, there is no need to form the punched holes for reducing the leaked magnetic flux between the permanent magnets 11. As a result, no restriction is imposed on the radial dimension of the permanent magnets 11 and the dimension L3 of the permanent magnets 11 in the direction perpendicular to the radial direction. The volume of the permanent magnets 11 can be increased without having to increase the diameter of the rotor 3. Accordingly, it is possible to increase the volume of the permanent magnets 11 while reducing the leaked magnetic flux.

As a consequence, as the permanent magnets 11, inexpensive ferrite magnets can be used in place of rear earth magnets such as neodymium magnets or samarium cobalt magnets, while maintaining the performance of the rotary electric machine 1. It is therefore possible to realize the rotary electric machine in an extremely cost-effective manner.

By filling an adhesive agent in the air gaps (gaps 20) between the permanent magnets 11 and the connecting portion 12, it is possible to increase the bonding strength between the permanent magnets 11 and the laminated iron core 10.

In the present embodiment, it is possible to obtain the following effects. In case where an attempt is made to increase the volume of the permanent magnets, it is required that, due to the characteristics of the rotary electric machine, the outer circumferential surfaces of the magnetic pole portions of the laminated iron core arranged between the permanent magnets should have a constant dimension in the circumferential direction. Therefore, the dimension of the permanent magnets in the direction perpendicular to the radial direction is limited by the magnetic pole portions.

However, in the present embodiment, the magnetic pole portions 13 are configured to include the flanges 18 partially covering the outer surfaces of the permanent magnets 11. The provision of the flanges 18 makes it possible to secure the necessary dimension in the circumferential direction of the outer circumferential surfaces of the magnetic pole portions 13. Regardless of the limitation stated above, it is therefore possible to increase the dimension L3 of the permanent magnets 11 in the direction perpendicular to the radial direction.

On the other hand, if the radial dimension of the permanent magnets and the dimension of the permanent magnets in the direction perpendicular to the radial dimension are set larger than a specified dimension, the adjoining permanent magnets make contact with each other at the radial inner opposite ends thereof. Thus the radial dimension of the permanent magnets and the dimension of the permanent magnets in the direction perpendicular to the radial dimension are limited by the circumferential gap (pole pitch) between the permanent magnets.

In the present embodiment, each of the permanent magnets 11 is configured to include the taper portion 19 formed at the radial inner side thereof. The dimension L3 of the taper portion 19 in the direction perpendicular to the radial direction grows smaller radially inward. By providing the taper portion 19 at the radial inner side of each of the permanent magnets 11, it is possible to prevent the adjoining permanent magnets 11 from making contact with each other at the radial inner opposite ends thereof. Regardless of the limitation stated above, it is therefore possible to increase the radial dimension of the permanent magnets 11 and the dimension L3 of the permanent magnets 11 in the direction perpendicular to the radial direction.

With the configuration described above, it is possible to increase the size of the permanent magnets 11 without increasing the diameter of the rotor 3, i.e., the size of the rotary electric machine 1.

In the present embodiment, it is also possible to obtain the following effects. As described above, the laminated iron core 10 has a structure in which ten magnetic pole portions 13 protrude radially outward from the tubular connecting portion 12. Therefore, it is likely that stresses are concentrated on the joint regions C between the connecting portion 12 and the magnetic pole portions 13. In the present embodiment, the connecting portion 12 includes the thick sections 15 formed near the respective joint regions C of the magnetic pole portions 13 in the circumferential direction. The radial thickness of the thick sections 15 is larger than the radial thickness of other circumferential sections of the connecting portion 12 than the joint regions C. This makes it possible to increase the strength of the joint regions C between the connecting portion 12 and the magnetic pole portions 13 on which stresses are likely to concentrate. Accordingly, the laminated iron core 10 can have a structure stable in strength.

In the present embodiment, the outer circumferential surface of the connecting portion 12 is flat between the joint regions C joined to the magnetic pole portions 13. Thus the connecting portion 12 becomes thick near the joint regions C between the connecting portion 12 and the magnetic pole portions 13. This makes it possible to increase the strength of the joint regions C between the connecting portion 12 and the magnetic pole portions 13 on which stresses are likely to concentrate.

As compared with a case where the outer circumferential surface of the connecting portion 12 is formed into a curved shape so that the radial thickness of the connecting portion 12 can be uniform along the circumferential direction, it is possible to increase the angle θ (see FIG. 3) between the outer circumferential surface of the connecting portion 12 and the joint section 17 of each of the magnetic pole portions 13. This provides an effect of alleviating the concentration of stresses in the joint regions C between the connecting portion 12 and the magnetic pole portions 13.

In the present embodiment, each of the magnetic pole portions 13 includes the body section 16 and the joint section 17. The body section 16 has the flanges 18 at the circumferential opposite sides of the radial outer end thereof. The dimension L1 of the body section 16 in the direction perpendicular to the radial direction grows smaller radially inward. The joint section 17 is configured to interconnect the body section 16 and the connecting portion 12. The dimension L2 of the joint section 17 in the direction perpendicular to the radial direction is substantially constant. The joint section 17 is positioned between the taper portions 19 of the permanent magnets 11. Accordingly, by reducing the dimension L2 of the joint section 17 in the direction perpendicular to the radial direction as far as possible, it is possible to increase the volume of the permanent magnets 11 and to reduce the leaked magnetic flux Φ (see FIG. 2). This makes it possible to increase the magnetic flux Φd and the magnet torque, thereby increasing the torque of the rotor 3.

The present invention is not limited to the embodiment described above but may be modified in many different forms without departing from the spirit and scope of the present invention. For example, while the magnet accommodating air gaps 14 for accommodating the permanent magnets 11 are formed into an axially-penetrated and radially-outwardly-opened groove shape in the foregoing embodiment, the present invention is not limited thereto.

Figure 4:
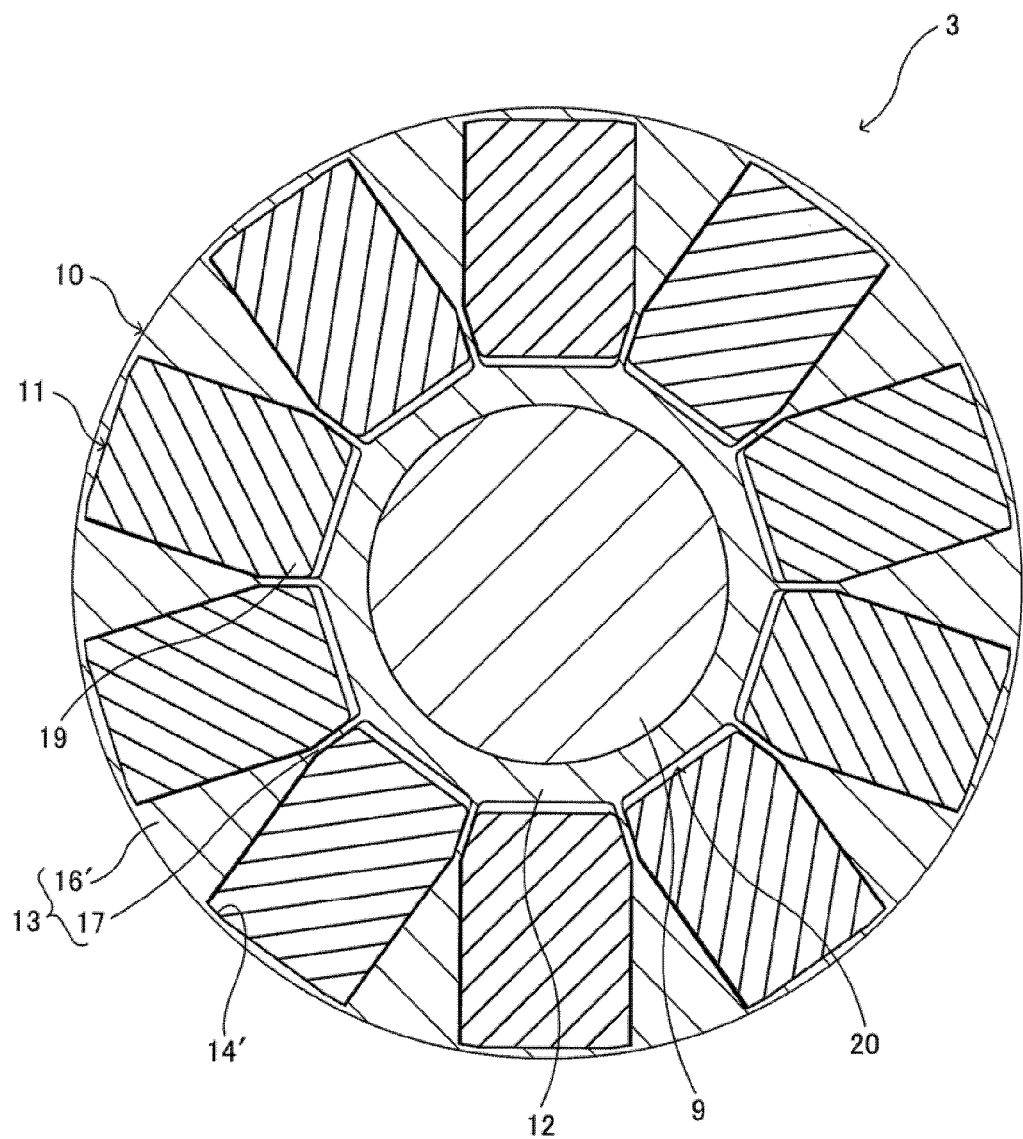
FIG. 4 is a section view corresponding to the cross section taken along line II-II in FIG. 1, which shows a modified example in which magnet accommodating air gaps are formed into a hole shape not opened radially outward.

Alternatively, as shown in FIG. 4, a magnet accommodating air gaps 14' for accommodating the permanent magnets 11 may be formed into an axially-penetrated hole shape not opened radially outward. In the laminated iron core 10 of the present modified example, the radial outer ends of body sections 16' of the magnetic pole portions 13 (i.e., the radial outer ends of the body sections 16' of the adjoining magnetic pole portions 13) are connected to each other in the circumferential direction. The outer surfaces of the respective permanent magnets 11 make close contact with the inner circumferential surfaces of the magnet accommodating air gaps 14'. Each of the permanent magnets 11 is offset radially outward within each of the magnet accommodating air gaps 14' in such a way that a specified gap 20 exists between the inner surface of each of the permanent magnets 11 and the connecting portion 12.

With the present modified example, just like the foregoing embodiment, it is possible to increase the volume of the permanent magnets 11 while reducing the leaked magnetic flux. In the present modified example, the magnet accommodating air gaps 14' are formed into a hole shape not opened radially outward, whereby the laminated iron core 10 is one-piece formed through the circumferential joint. Accordingly, as compared with a case where the magnet accommodating air gaps are formed into a radially-outwardly-opened groove shape, it is possible to increase the torsional rigidity of the laminated iron core 10. Moreover, as compared with the case where the magnet accommodating air gaps are formed into the radially-outwardly-opened groove shape, it is possible to increase the bonding area of the permanent magnets 11. This makes it possible to enhance the bonding reliability.

While the foregoing description is directed to a case where the rotary electric machine 1 is of an inner-rotor-type in which the rotor 3 is arranged inside the stator 2, the present invention is not limited thereto but may be applied to an outer-rotor-type rotary electric machine in which a rotor is arranged outside a stator.

In addition, while the foregoing description is directed to a case where the rotary electric machine 1 is an electric motor, the present invention is not limited thereto but may be applied to a case where the rotary electric machine is a generator.

In addition to the foregoing description, the embodiment and the modified example described above may be appropriately combined.

While not specifically illustrated, the embodiment and the modified example described above may be modified in many different forms without departing from the spirit and scope of the present disclosure.

What is claimed is:

1. A rotary electric machine, comprising:
   a stator; and
   a rotor including an iron core and a plurality of permanent magnets, the iron core having a tubular connecting portion surrounding a rotating shaft and a plurality of magnetic pole portions integrally formed with the connecting portion and the permanent magnets being arranged between the magnetic pole portions,
   wherein the iron core includes axially-penetrated magnet accommodating air gaps formed between the magnetic pole portions at the radial outer side of the connecting portion, and
   the permanent magnets are installed in the respective magnet accommodating air gaps such that a radial outer surface of each of the permanent magnets makes close contact with an inner surface of each of the magnet accommodating air gaps and such that a specified gap exists between a radial inner surface of each of the permanent magnets and the connecting portion,
   wherein at least a portion of each of the permanent magnets includes a taper portion, a dimension of the taper portion in a direction perpendicular to a radial direction becoming smaller radially inward, and
   wherein the entire radial outer surface of the connecting portion between joint regions is flat, the connecting portion and the magnetic pole portions being joined at the joint regions.

2. The machine of claim 1, wherein each of the magnetic pole portions includes a flange for covering a portion of the radial outer surface of each of the permanent magnets such that at least a portion of the radial outer surface of each of the permanent magnets is exposed, and
   each of the permanent magnets is installed in each of the magnet accommodating air gaps such that the radial outer surface of each of the permanent magnets makes close contact with a radial inner surface of the flange.

3. The machine of claim 1, wherein the connecting portion includes thick sections formed near circumferential joint regions joined to the magnetic pole portions, each of the thick sections having a radial thickness larger than a radial thickness of other circumferential sections of the connecting portion than the joint regions.

4. The machine of claim 2, wherein each of the magnetic pole portions includes a body section and a plate-like joint section, the body section including the flanges formed at a radial outer end thereof to extend in circumferential opposite directions, the dimension of the body section in the direction perpendicular to the radial direction grows smaller radially inward, the joint section being arranged to interconnect the body section and the connecting portion, the dimension of the joint section in the direction perpendicular to the radial direction being kept substantially constant, and
   wherein the joint section is positioned between the taper portions of two neighboring permanent magnets.

5. The machine of claim 1, wherein each of the magnetic pole portions includes a body section and a plate-like joint section, the dimension of the body section in the direction perpendicular to the radial direction growing smaller radially inward, the joint section being arranged to interconnect the body section and the connecting portion, the dimension of the joint section in the direction perpendicular to the radial direction being kept substantially constant, and
   wherein the joint section is positioned between the taper portions of two neighboring permanent magnets.

* * * * *